(12) United States Patent
Richardson

(10) Patent No.: US 10,045,064 B2
(45) Date of Patent: Aug. 7, 2018

(54) SYSTEMS AND METHODS FOR ON-SCREEN DISPLAY OF CONTENT INFORMATION

(75) Inventor: Jon Richardson, Chamblee, GA (US)

(73) Assignee: ECHOSTAR TECHNOLOGIES LLC, Englewood, CO (US)

( * ) Notice: Subject to any disclaimer, the term of this patent is extended or adjusted under 35 U.S.C. 154(b) by 0 days.

(21) Appl. No.: 13/112,841

(22) Filed: May 20, 2011

(65) Prior Publication Data
US 2012/0297419 A1   Nov. 22, 2012

(51) Int. Cl.
*H04N 21/431* (2011.01)
*H04N 21/4363* (2011.01)

(52) U.S. Cl.
CPC ... *H04N 21/4312* (2013.01); *H04N 21/43635* (2013.01)

(58) Field of Classification Search
CPC ........... G09G 2370/12; G09G 2370/06; H04N 21/482; H04N 21/43635
USPC .............................. 725/37–61, 131, 141, 153
See application file for complete search history.

(56) References Cited

U.S. PATENT DOCUMENTS

| | | | | |
|---|---|---|---|---|
| 6,219,839 B1 * | 4/2001 | Sampsell | ............ | H04L 12/2805 348/E5.103 |
| 7,941,821 B2 * | 5/2011 | Stecyk | ................ | H04L 12/2805 340/12.53 |
| 8,286,210 B2 * | 10/2012 | Boyden | .................. | G09G 5/006 710/1 |
| 2003/0113100 A1 * | 6/2003 | Hecht | ................... | H04N 5/4401 386/330 |
| 2005/0033887 A1 * | 2/2005 | Kim | ........................ | G08C 17/00 710/110 |
| 2006/0259926 A1 * | 11/2006 | Scheelke et al. | ................ | 725/48 |
| 2008/0098318 A1 * | 4/2008 | Kim | .................... | H04N 5/44543 715/765 |
| 2008/0244097 A1 * | 10/2008 | Candelore | ........ | H04N 21/43615 710/5 |
| 2008/0271073 A1 * | 10/2008 | Kim | ..................... | H04N 5/4403 725/37 |
| 2008/0271074 A1 * | 10/2008 | Bae et al. | ........................ | 725/38 |
| 2008/0291324 A1 * | 11/2008 | Hong | ..................... | H04N 5/772 348/484 |
| 2009/0083825 A1 * | 3/2009 | Miller et al. | ................... | 725/151 |
| 2009/0207039 A1 * | 8/2009 | Haijima | ................. | G08C 17/00 340/4.3 |
| 2010/0064312 A1 * | 3/2010 | Francis | ..................... | G06F 3/14 725/37 |
| 2010/0269137 A1 * | 10/2010 | Nakajima et al. | .............. | 725/39 |
| 2011/0107369 A1 * | 5/2011 | O'Brien et al. | ................. | 725/38 |
| 2012/0041925 A1 * | 2/2012 | Pope et al. | ..................... | 707/626 |

(Continued)

FOREIGN PATENT DOCUMENTS

WO   WO 2008056708 A1 *   5/2008   ............... H04N 5/44

*Primary Examiner* — Alexander Q Huerta
(74) *Attorney, Agent, or Firm* — Lorenz & Kopf LLP

(57) ABSTRACT

Various systems and methods allow aggregation and display of content information associated with entertainment devices using a device-to-device messaging protocol such as that provided by the High Definition Multimedia Interface (HDMI) standard. Content information such as electronic program guide (EPG) data for multiple entertainment devices may be displayed, for example, using the on-screen display (OSD) of a single entertainment device.

9 Claims, 3 Drawing Sheets

(56) References Cited

U.S. PATENT DOCUMENTS

2012/0212672 A1* 8/2012 Mels ................ H04N 21/44029
                                                      348/554
2013/0002955 A1* 1/2013 Sato ....................... G09G 5/006
                                                      348/554

* cited by examiner

SYSTEMS AND METHODS FOR ON-SCREEN DISPLAY OF CONTENT INFORMATION

TECHNICAL FIELD

Various embodiments relate to the distribution of television or other media programming, and more particularly relate to systems, devices and/or methods for transmitting, receiving, and displaying content information via an on-screen display.

BACKGROUND

Present-day entertainment systems often include a large number of entertainment devices and related components. In a household environment, for example, it is not uncommon for an entertainment system to include a television or other display, a set-top box (STB), a digital video disc (DVD) player, an audio/visual receiver (AVR), a digital video recorder (DVR), and a console video game system.

One or more of the entertainment devices in a typical entertainment system may be controllable through some form of remote control component. For example, the display may be controlled by one remote control, while the STB may be controlled by another remote control. In addition, one or more of the entertainment devices will generally be capable of producing an on-screen display (OSD) of information relating to that device—e.g., an OSD that includes an electronic program guide (EPG) visually depicting the content that is available through the device, either directly or indirectly.

A user may be easily confused by the display (either simultaneously or non-simultaneously) of multiple OSD windows relating to different entertainment devices. That is, a user may interact with one OSD window to select an input source and interact with another OSD window to select a program to view. In such cases, it is difficult for the user to remember which remote control component should be used to interact with which OSD window. Further, it may be difficult to remember which OSD window should be used for viewing certain content information.

It is therefore desirable to create systems, devices and/or methods to more conveniently transmit, receive, and display content information using an on-screen display. These and other desirable features and characteristics will become apparent from the subsequent detailed description and the appended claims, taken in conjunction with the accompanying drawings and this background section.

BRIEF SUMMARY

A method in accordance with one embodiment includes storing, at a first entertainment device, first content information; sending a content information request from the first entertainment device to a second entertainment device via the electronics control bus; receiving second content information from the second entertainment device in response to the content information request; aggregating the first content information with second content information to produce aggregated content information; receiving a request to display the aggregated content information; and outputting the aggregated content information for display via an on-screen display.

An entertainment device in accordance with one embodiment includes a memory configured to store aggregated content information including first content information, and a processor. The processor is configured to send a content information request to a second entertainment device via an electronics control bus, receive second content information from the second entertainment device, aggregate the first content information with second content information to produce the aggregated content information, and respond to a request to display the aggregated content information via an on-screen display.

BRIEF DESCRIPTION OF THE DRAWING FIGURES

Exemplary embodiments will hereinafter be described in conjunction with the following drawing figures, wherein like numerals denote like elements, and:

DETAILED DESCRIPTION

The various embodiments described herein generally relate to systems and methods for aggregating and displaying content information associated with entertainment devices using a device-to-device messaging protocol such as that provided by the High Definition Multimedia Interface (HDMI) standard. Content information such as electronic program guide (EPG) data for multiple entertainment devices may be displayed, for example, using the on-screen display (OSD) of a single entertainment device.

The following detailed description of the invention is merely exemplary in nature and is not intended to limit the invention or the application and uses of the invention. Furthermore, there is no intention to be bound by any theory presented in the preceding background or the following detailed description.

Figure 1:
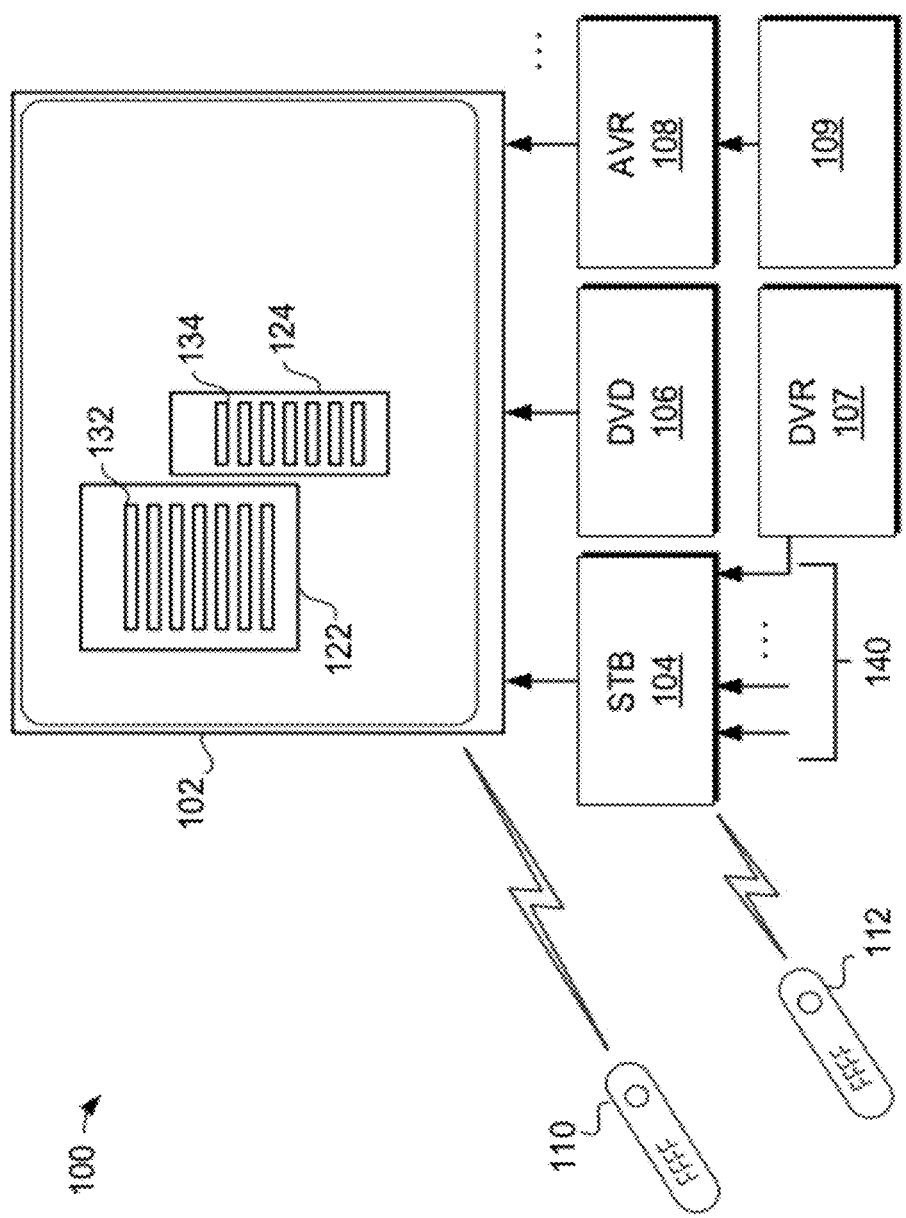
FIG. 1 is a diagram of an exemplary system illustrating the display of on-screen information in accordance with various embodiments.

Referring first to FIG. 1, an exemplary system useful in describing the present invention generally includes a set of interconnected entertainment devices (or simply "devices"), such as a display 102, a receiver, shown as a set-top box (STB) 104, a digital video disc (DVD) player 106, an audio/visual receiver (AVR) 108, digital video recorder (DVR) 107, and device 109. As shown, display 102 is generally communicatively coupled to the other devices directly (e.g., STB 104, DVD 106, and AVR 108) or indirectly through other devices (such as DVR 107 and device 109). In addition each device may have additional input sources, such as source inputs 140 of STB 104, described in further detail below.

One or more of the devices shown in FIG. 1 may be controllable through some type of remote control component. In the illustrated embodiment, for example, display 102 may be controlled via remote control component 110, and STB 104 may be controlled via remote control component 112.

In addition, one or more of the devices shown in FIG. 1 will generally be capable of interacting with display 102 to produce an on-screen display (OSD) of information relating to that device. For example, in the illustrated embodiment, STB 104 is configured to produce an OSD window 122 on display 102. OSD window 122 will generally include information 132 relating to operation of STB 104, some of which may be interactively responsive to user input (e.g., via remote control component 112). More particularly, STB 104 may be configured to receive a command from remote control component 112 and subsequently instruct display 102 to display OSD window 122 with content information 132 (such as EPG information or other selectable list of content available via STB 104). Through appropriate interaction with remote control component 112 (e.g., through the use of buttons, sliders, touch-screen regions, and the like), the user may scroll through, select, highlight, modify, and otherwise interact with content information 132 presented within OSD window 122. Note that the term "window" is used in a non-limiting matter, and is not limited to certain graphical window types often observed, for example, in conjunction with operating systems. The term "window" is thus used to indicate any region on display 102, with any desired opacity, which can display the desired information.

Similarly, display 102 may itself be configured to produce an OSD window 124 containing content information 134 relating to operation of display 102. In some embodiments, display 102 may output content information for display on another device. Interaction with OSD window 124 may then take place via remote control component 110 (in addition to any input components provided on display 102 itself). OSD windows 122 and 124 may overlie the primary video content or may be presented in a separate window from the primary video content.

The term "content information" as it relates to, for example, information displayed within OSD windows 122 and 124, encompasses a wide range of graphical and textual information relating to content available directly or indirectly through a particular device. In the illustrated example, window 122 associated with STB 104 will typically include electronic program guide (EPG) information that shows (e.g., in list or matrix format) broadcast programming or other content available through various source input 140, and will allow the user to select from the displayed list. Without loss of generality, this information may be referred to herein in the context of a set-top box and display; however, the invention is not so limited.

With continued reference to FIG. 1, it will be apparent that a user may be easily confused by the display of multiple OSD windows relating to different devices. OSD windows 122 and 124 may be simultaneously or non-simultaneously displayed. However, in each case, it may be difficult for the user to remember which remote control component (110 or 112) should be used to interact with the corresponding OSD window (122 and 124). In accordance with the present invention, content information from multiple devices (such as STB 104, DVR 107, etc.) is aggregated by one of the devices (such as display 102) and then displayed to the user via a single OSD (such as OSD window 124). Aggregation may take place in the background and/or in response to user input. In a particular embodiment, aggregation of content information and subsequent on-screen display of that content information is accomplished through High Definition Multimedia Interface (HDMI) connections.

Figure 2:
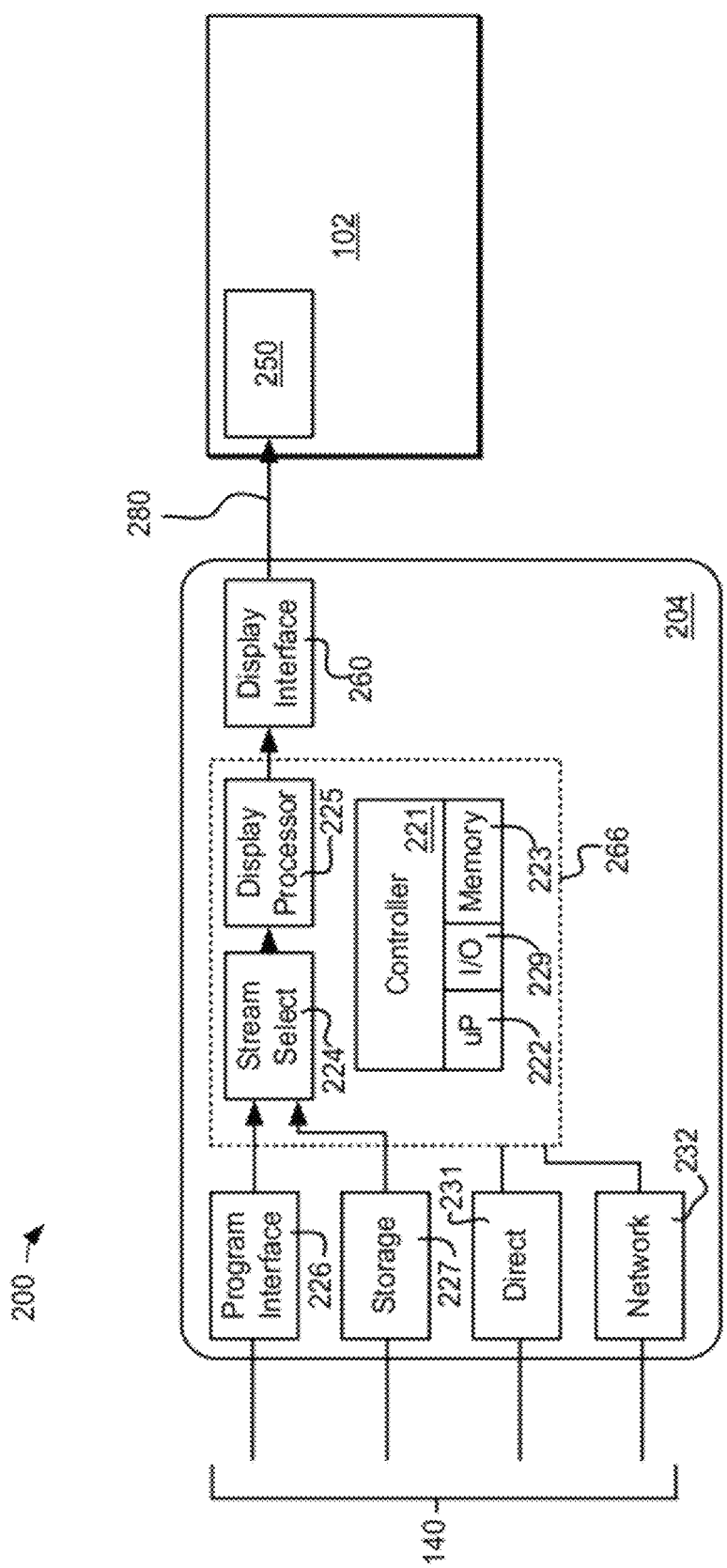
FIG. 2 is a conceptual block diagram of an exemplary system for on-screen display of information.

Referring now to FIG. 2 in conjunction with FIG. 1, a receiver 204 (which may be incorporated into various devices shown in FIG. 1, such as STB 104) is configured to receive, decode and render programming on display 102 based on any number of source inputs 140. In various embodiments, one or more source inputs 140 correspond to broadcasts received over a conventional distribution channel, such as a terrestrial broadcast system, a cable television system, a direct broadcast satellite (DBS) system, or the like. Examples of "broadcasters" in different embodiments may include various sorts of television broadcast stations, cable distribution systems, DBS transmission systems, network distribution systems or the like. In other embodiments, source inputs 140 may be coupled to the Internet or another digital network using any sort of file-based, stream-based, on-demand or other distribution technique.

In various embodiments, one or more of source inputs 140 may receive content that includes metadata, such as information about the various elementary streams making up a particular program. The metadata may include, for example, clock data, an index of the identifiers associated with each elementary stream within a source input 140, a conventional MPEG program map table (PMT), and/or indexes of program and stream information contained within an electronic program guide (EPG).

Receiver 204 comprises any combination of system, device or other component that includes appropriate hardware, software, firmware and/or other processing logic to implement the various functions related to receiving and presenting video programming to a viewer. Receiver 204 may be a conventional television receiver, for example, such as any type of set top box (STB) or similar system that receives programming content from a terrestrial broadcast, cable or satellite distributor for presentation on a television or other display 102. Other types of receivers 204 may receive and process programming received from network, stored media, broadcast and/or other sources as desired.

In the example shown in FIG. 2, receiver 204 suitably includes a controller 221 that interacts with a programming interface 226, a network interface 232, a storage interface 227 to a DVR (such as DVR 107) or the like, a display interface 260 to display 102, and/or a direct connect interface 231 to an external device (not illustrated). Various equivalent embodiments of receiver 204 may be implemented within any additional or alternate components or products or arrangements that may differ from those shown in FIG. 2.

Controller 221 suitably includes any combination of microprocessors, microcontrollers, digital signal processors or other programmable hardware capable of directing the actions and functions of receiver 204. Controller 221 typically obtains programming content received via program interface 226 and renders the video, audio and/or supplemental content contained within a demodulated transport stream (from a source input 140) for output at display interface 260 and presentation on display 102. To that end, controller 221 identifies and extracts relevant elementary streams within the received transport stream, and generates an appropriate output signal 280 to present video and/or audio content on display 102. Controller 221 may further direct the storage or retrieval of programming content on DVR 107 or the like, as well as any communications via direct interface 231 and/or network interface 232.

In various embodiments, controller 221 is based upon a "system on chip" (SoC) implementation that incorporates microcontroller hardware 222 with memory 223, input/output interfaces 229, and other features to perform the various signal processing and other actions of receiver 204. Various SoC and other integrated video processing implementations are available from Texas Instruments, Conexant Systems, NXP Semiconductor, Broadcom Inc., and many other suppliers as appropriate. Other embodiments may implement controller 221 and/or the other features of receiver 204 with any number of separate processing components, such as any number of separate chips that provide specific functions (e.g., decoding, demodulation, decryption, transcoding and/or the like), as well as any additional memories 223, input/output interfaces 229 and/or other features as desired.

In the illustrated embodiment, a stream select module 224, a display processor module 225 and a control module 221 are implemented via an SoC or other shared processing hardware 266. In this example, stream select module 224 is any hardware and/or software logic capable of decoding desired programming content from the available sources 140 for presentation on one or more interfaces 260. Stream select module 224 therefore responds to viewer inputs (received, e.g., via input/output interfaces 229) to obtain, decompress or otherwise decode the programming received via programming interface 226, storage interface 227, network interface 232, and/or direct interface 231. In some embodiments, stream select module 224 is implemented using conventional MPEG or other decompression/decoding functions provided within SoC hardware 266. Other embodiments may use separate decoder/decompression logic, such as a separate decoder chip, to perform similar functions.

Display processor module 225 includes any appropriate hardware, software and/or other logic to create desired screen displays at interface 260 as desired. In various embodiments, display processor module 225 is able to decode and/or transcode the received media to a format that can be presented on interface 260. The generated displays, including received/stored content and any other displays may then be presented to one or more interfaces 260 in any desired format. In various embodiments, display processor 225 produces an output signal encoded in any standard format (e.g., ITU656 format for standard definition television signals or any format for high definition television signals) that can be readily converted to standard and/or high definition television signals at interface 260.

Display processing module 225 is also able to produce OSDs (such as OSD windows 122 and 124) for displaying information, as discussed in detail above. Such displays are not typically contained within the received or stored broadcast stream, but are nevertheless useful to users in interacting with receiver 204.

Various embodiments may allow receiver 204 to automatically or manually (e.g., in response to a viewer input) obtain additional information from a server or other system that is accessible a network (such as the Internet) coupled to network interface 232. Network interface 232 operates using any implementation of protocols or other features to support communication over a network. In one embodiment, network interface 232 supports conventional LAN, WAN or other protocols (e.g., the TCP/IP or UDP/IP suite of protocols widely used on the Internet). Network interface 232 typically includes interface hardware such as LAN adapter hardware, a conventional network interface card (NIC), a USB-based WiFi interface, or the like provided within receiver 204.

Receiver 204 may include a direct connect interface 231, such as any physical, logical and/or other features that can be used to interface with an external computer, mobile phone, storage medium or other device as appropriate. In various embodiments, direct connect interface 231 is a universal serial bus (USB), IEEE 1394 ("Firewire") or other standard wired interface that allows viewers to transfer data between receiver 204 and an external device over a cable or other physical connection via a source input 140. Other embodiments may additionally or alternately implement direct interface 231 with a wireless receiver, transceiver or other module capable of wirelessly exchanging data. Examples of wireless direct connect interfaces 231 include conventional IEEE 802.15.4 ("ZIGBEE") or other wireless local area network (WLAN) transceivers, including transceivers that implement other wireless signaling techniques such as IEEE 802.15.1 ("BLUETOOTH"), IEEE 802.11 ("WI-FI") and/or the like.

Programs for viewing or other processing may be selected in any manner. In many cases, receiver 204 selects a television program, movie, media stream or other programming in response to viewer inputs received via a remote control (such as remote control component 112) or other user interface as desired. Such viewer inputs may be received at input/output interfaces 229 or elsewhere in response to viewer interaction with OSD window 122. In various embodiments, viewers are able to user OSD window 122 to select programming from programming interface 226 (e.g., terrestrial, cable, DBS or other broadcast programming), from programs previously stored in DVR 107 via storage interface 227, from streaming video received via network interface 232, from a file server or storage device directly connected via direct connect interface 231, and/or from any other source input 140.

The selected program is then received in any manner and then demodulated, as appropriate, to extract the digital transport stream containing the various elementary streams that contain the program content. The received transport stream is then processed as appropriate to identify the desired elementary streams that contain the desired program content. The particular streams are identified though information conveyed in data contained within the transport stream, and/or other information available to receiver 204 via an EPG or other source. In various embodiments, the EPG associated with receiver 204 is regularly updated to contain information that identifies the particular streams of each available transport stream according to PIDs or other identifiers, as appropriate.

Display interface 260 comprises any physical and/or logical interface to a television or other display 102. Some types of receivers 204 may incorporate a built-in display 102, such as the display in a laptop or other portable computer, a media player, a portable television and/or the like. In other embodiments wherein receiver 204 provides video output signals 280 to an external display 102, such signals 280 may be provided in any compatible format. In embodiments wherein display 102 is a conventional television, for example, display interface 260 may provide video and audio output signals in any conventional format, such as component video, S-video, HDMI, Digital Visual Interface (DVI), IEEE 1394, and/or any other formats as desired. In a particular embodiment, signals 280 are transferred in accordance with an HDMI interface.

HDMI is an audio/video interface for transmitting uncompressed digital data, and implements certain EIA/CEA-861 standards that define video formats and waveforms, transport of LPCM audio, and auxiliary data. In general, HDMI supports, on a single cable, uncompressed video, up to 8 channels of compressed or uncompressed digital audio, a consumer electronics control (CEC) connection, and an Ethernet data connection. As used herein, the term "HDMI" refers to past HDMI versions (HDMI 1.0-1.4) and future versions as may be appropriate to implement embodiments of the present invention. HDMI versions 1.0-1.4 are hereby incorporated by reference.

In accordance with one embodiment of the present invention, aggregation and on-screen display of content information for one or more entertainment devices is implemented using a CEC connection within the HDMI protocol. CEC is a feature of HDMI that allows, for example, a user to control two or more CEC-enabled devices connected via HDMI while using a single remote control. CEC also allows CEC-enabled devices to command and control each other without user intervention.

Figures 3, 4:
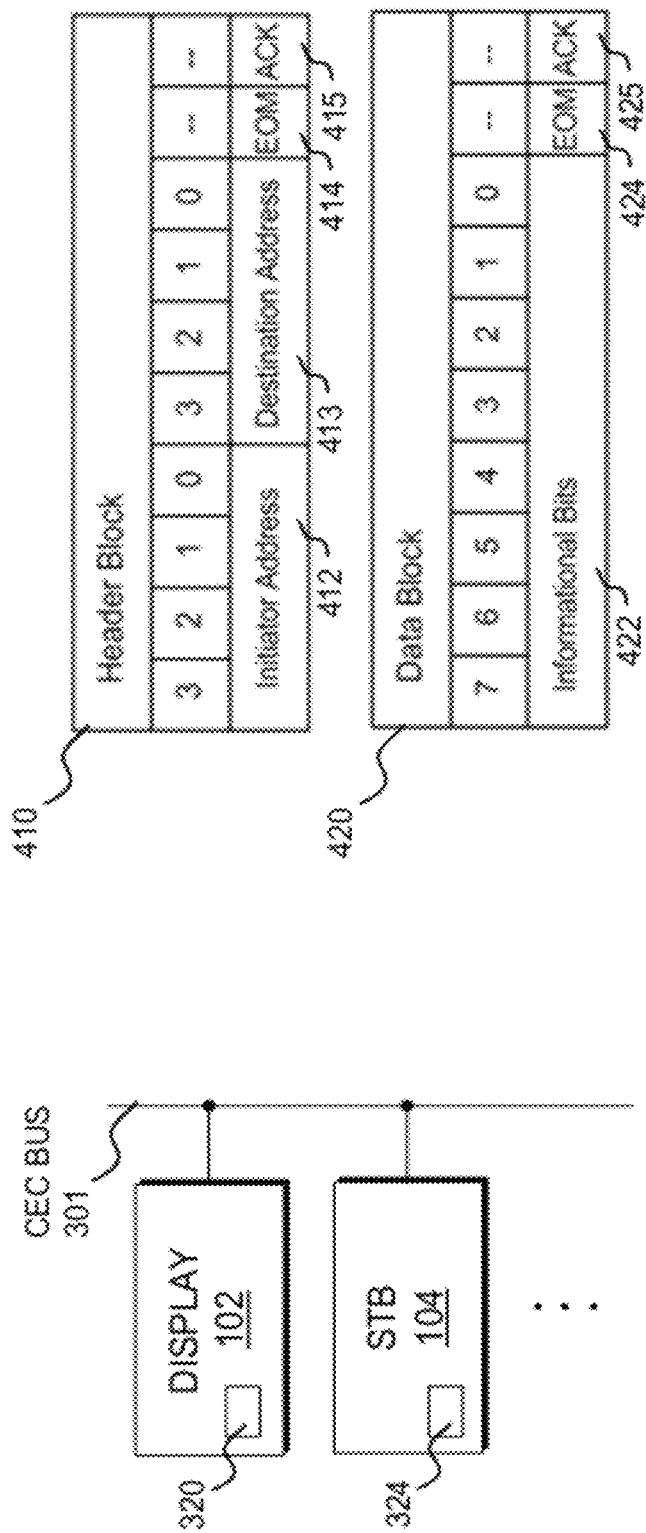
FIG. 3 is a conceptual block diagram of devices connected to a CEC bus in accordance with one embodiment.
FIG. 4 presents the structure of exemplary CEC header and data blocks.

Referring now to the conceptual block diagram shown in FIG. 3, one or more CEC-enabled devices are connected to a CEC bus 301 after, for example, the devices have been powered on and have performed a self-discovery procedure as specified by the relevant portion of the CEC specification. In the example shown in FIG. 3, only display 102 and STB 104 are shown connected to CEC bus 301; however, additional devices may also be connected to bus 301, limited only by the CEC specification implemented by the devices (e.g., ten or less devices in some versions of the specification). As is known, CEC bus 301 is a bidirectional serial bus using a standard AV link protocol. That is, CEC is effectively a one-wire "party line." While the present application discusses communication within the context of a CEC protocol, other electronics control protocols that allow inter-device communication and control may alternatively be utilized.

STB 104 stores certain content information 324 relating to content (e.g., television shows, Web-based media, or the like) that is available either directly or indirectly through STB 104. Content information 324 may be stored in any suitable memory or storage component, such as memory 223 illustrated in FIG. 2. Similarly, display 102 is configured to store content information 320 that includes content available directly via display 102 in addition to content information aggregated from other devices (such as STB 104), as described in further detail below.

The CEC protocol set forth in the HDMI specification includes automatic mechanisms for physical address discovery, product-type-based logical addressing, arbitration, retransmission, broadcasting, and routing control. CEC-enabled devices (such as display 102 and STB 104), when interconnected via CEC bus 301, perform a self-discovery system and share certain information, such as device type and manufacturer. That is, each CEC-enabled device is at least partially aware of the capabilities of other CEC-enabled devices in the system. Features enabled by version 1.3a of the CEC specification include, for example, one-touch record, system standby, tuner control, timer programming (EPG control), device menu control, and system audio control.

CEC assumes that all entertainment devices in a system are directly or indirectly connected to a root display in a tree, where sources are considered "leaf" nodes. Accordingly, display 102 and STB 104 in FIG. 3 each have a corresponding physical address and logical address. During initialization, or "hot-plug", display 102 and STB 104 each obtain a physical address via the CEC protocol, which consists of four numbers indicating that device's place in the hierarchy relative to a "root" address of 0.0.0.0. For example, if display 102 is considered the "root", and STB 104 is attached to an input number 1 of display 102, then STB 104 will have a physical address of 1.0.0.0.

Display 102 and STB 104 will also obtain a logical address reflecting its product type by negotiating with each other via CEC bus 301. Further information regarding logical addresses can be found, for example, in the HDMI specification, and need not be described in detail herein. For the purposes of this example, it will be assumed that display 102 has a logical address of 0, and STB 104 has a logical address of 3.

In general, communication over CEC bus 301 is performed between an initiator and one or more followers. Initiator-asserted bits provide data, while follower-initiated bits provide acknowledgement. CEC messages are sent over CEC bus 301 using frames, where each frame consists of a start bit followed by header block and optional data blocks.

More particularly, as shown in FIG. 4, a CEC message generally consists of a ten-bit header block 410 followed by zero or more ten-bit data blocks 420. Header block includes a four bit initiator address 412 (containing a logical address) followed by a four bit destination address 413 (also containing a logical address). The block is terminated by an end-of-message (EOM) bit 414 followed by an acknowledge bit (ACK) 415. The EOM bit 414 signals the final block in a message. That is, a "0" indicates that one or more blocks follow, and a "1" indicates that the message is complete. When a single follower provides an ACK 415 to an initiator, it does so by overriding the output from the initiator (pulling bus 301 to a "0" while the initiator sends a "1").

Consider an example of communication from STB 104 to display 102 over CEC bus 301, in which STB 104 is considered the initiator, and display 102 is the follower. The message begins with a start bit, followed by a header block 410 containing an initiator address 412 of "0011" (logical address 3 of STB 104) and a destination address 413 of "0001" (logical address 1 of display 102). This is followed by an EOM bit 414 of "0" and an ACK 415 of "0". The subsequent data blocks 420 would then include eight information bits (422) (generally, an operational code ("opcode") and any necessary parameters). Each 10-bit data block 420, except the final one, will have an EOM bit 424 set to '0'. Each data block 420 sent by STB 104 will have its ACK bit 425 "overridden" by display 102. If any block in a frame is not acknowledged, initiators will sense the condition and may retransmit a predetermined number of times (e.g., 5 times).

In accordance with one embodiment of the present invention, CEC messages are sent from one device to another device (the "aggregating device") to facilitate aggregation of content information. To accomplish this, specific messages (generally, predetermined "opcodes" followed by one or more parameters) are incorporated into one or more data blocks 420 and transmitted between the CEC-enabled devices. In this way, a single remote control component (e.g., remote control component 112) may be used to display content information available via multiple devices. For example, content information 324 from STB 104 (and perhaps other devices) may be aggregated and stored along with content information 320 of display 102. In accordance with one embodiment, a standardized set of opcodes ("aggregation opcodes") are implemented and used in multiple entertainment devices available from multiple vendors. That is, multiple vendors may agree a priori (e.g., by establishing a standard) to utilize a particular set of opcodes to accomplish the aggregation of content information. In another embodiment, vendors use different vendor-specific opcodes for the aggregation of content information, but those opcodes are known by the aggregating device. The content information request may include an operational code selected from a set of operational codes associated with respective manufacturers. Alternatively, the content information request may include a parameter specifying a manufacturer associated with a device from which the content information is requested.

In an exemplary embodiment, the aggregation opcodes and parameters include at least four opcodes: (1) an opcode requesting that content information be sent from available devices as a background process (referred to generically as "opcodes"), (2) an opcode requesting that content information be sent from available devices immediately ("opcode2"), (3) an opcode indicating that content information is being sent ("opcode3"), and (4) an opcode to command a device to play specific content. In the latter case, the opcode might be accompanied by standard CEC commands to select the appropriate inputs on an AVR or other device downstream from the component that is playing the content.

Opcode 1 would generally be transmitted by the aggregating device (e.g., display 102) during startup, after reset, and/or when the aggregating device determines that the aggregated content information (e.g., content information 320) is not up-to-date. Determining whether or not the aggregated content information is up-to-date may be achieved in a variety of ways known in the art, for example, by comparing check-sums of the aggregated content information to the corresponding check-sum of content information available from the devices from which content information is being received.

Opcode1 initiates aggregation in the "background." That is, given that the amount of content information from certain devices, such as a DVR, might be substantial, it is advantageous in some cases for aggregation to occur in a way that is transparent to the user and does not deleteriously affect (i.e., slow down) other operations (such as viewing of content) that might be taking place simultaneously.

Opcode2, on the other hand, is intended to initiate aggregation immediately (or as soon as possible) in response, for example, to a request by the user or some other source. That is, the user may request, through the use of a remote control, that content information (in the form of an EPG) be displayed for perusal. In some cases, the aggregated content information may not be up-to-date at the time the request is made. Accordingly, it is advantageous for aggregation to take place immediately so that it can be displayed to the user.

Opcode1 and opcode2 may have one or more parameters specifying that only a subset of the content information should be sent. In one embodiment, for example, the opcode1 and/or opcode2 parameters include a range of times (a time-based subset). When this parameter is used, only content information relating to content available within that range of times will be aggregated. In another embodiment (a name-based subset), the parameters include an alphabetical parameter that indicates that only content information relating to content starting with or containing a certain letter or combination of letters is aggregated (e.g., all shows starting with the letter 'B'). In yet another embodiment, only a single opcode is used in place of opcode1 and opcode2, but a parameter is used to specify whether the aggregation should take place in the background or immediately.

Opcode3 is used by a device responding to a request from the aggregating device (e.g., a request in the form of opcode1 or opcode2). Opcode3 is thus used to transfer content information over CEC bus 301 using a parameter or parameters that include all or part of the content information for that device.

Referring again to the simplified device topology shown in FIG. 3, a typical aggregation process, in the context of HDMI, might proceed as follows. First, display 102 and STB 104 (assumed to be CEC-enabled devices) engage in a self discovery process in which logical and physical addresses are assigned to each device. Further, one device is designated as the "aggregating device," based either on the logical address of the device or user preference (i.e., a user may set one device to be the aggregating device). For the purpose of this example, it will be assumed that display 102 is the aggregating device, and that content information 320 includes the aggregated content information. Similarly, it will be assumed that the aggregated content information 320 is not up-to-date (as determined via a check-sum or the like).

Next, the aggregating device (display 102) sends a message (e.g., opcode1) over CEC bus 301 requesting content information from other CEC-enabled devices. Opcode1 may be parameterless or followed by one or more parameters, as discussed above. Opcode1 is sent in accordance with the CEC protocol as shown in FIG. 4. That is, after a start bit, the initiator address 412 of header block 410 is set to the logical address of display 102, the destination address 413 is set to the logical address of STB 104 (or the message is designated as a broadcast to all other devices, as provided by the CEC standard), and the EOM bit 414 is set to "0". Data block 420 is then used to transmit various parameters, if appropriate, wherein the EOM bit 424 of the last data block is set to "1".

Upon receiving the opcode1 message, and acknowledging it via ACK bit 425, STB 104 accesses its content information 324 and sends it to display 102 using opcode3 followed by the content information itself. More particularly, a header block 410 includes an initiator address 412 corresponding to the logical address of STB 104, a destination address 413 corresponding to the logical address of display 102, followed by a plurality of data blocks 420 containing all or a portion of the content information 324 (as determined by any parameters sent by display 102).

After acknowledging each portion of the received content information, display 102 suitably stores the received information as aggregated content information 320 where it can be accessed for a variety of purposes. For example, an OSD of display 102 may be accessed by a user to select a particular television program, digital video recording, Internet-based media, or any other such content available via any CEC-enabled device coupled to CEC-bus 301. More particularly, in accordance with the CEC portion of the HDMI specification, display 102 can transmit an instruction over CEC-bus 301 instructing STB 104 to play or otherwise transmit the desired program for viewing by a user via display 102.

The various functions, methods, and other features described herein may be performed by any hardware, software and/or firmware logic stored in any tangible storage medium within receiver 204, including any sort of optical, magnetic or other storage hardware. In some embodiments, its various functions are implemented using software or firmware logic that is stored within a flash memory or ROM (e.g, memory 223) and executed by controller 221 executing on SoC 266, processor 222 and/or other processing hardware within receiver 204. Other embodiments, however, will execute one or more functions on other processing servers, circuits or other logic located external to receiver 204.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

The term "exemplary" is used herein to represent one example, instance or illustration that may have any number of alternates. Any implementation described herein as exemplary is not necessarily to be construed as preferred or advantageous over other implementations.

What is claimed is:

1. A method of aggregating content information at a first entertainment device coupled to a second entertainment device over an electronics control bus, comprising:
    storing, at the first entertainment device, first content information;
    sending a content information request from the first entertainment device to the second entertainment device via the electronics control bus;
    receiving second content information from the second entertainment device in response to the content information request, wherein the first content information and the second content information comprise electronic programming guide information;
    aggregating the first content information with second content information to produce aggregated content information;
    receiving a request to display the aggregated content information; and
    outputting the aggregated content information for display on an on-screen display;
    wherein the electronics control bus is configured to allow a user to control the first entertainment device and the second entertainment device utilizing a single remote control device, and further allows the first entertainment device to command and control the second entertainment device without intervention from the user;
    wherein the content information request includes a first operation code incorporated into a first data block transmitted via the electronics control bus, and the second content information is received in conjunction with a second operation code incorporated into a second data block transmitted via the electronics control bus;
    wherein the first and second data blocks have substantially equal bit-lengths, and the second data block terminates with an end-of-message bit set only in the final block of the second content information;
    wherein the first operation code and second operation code are each selected from a predetermined set of aggregation operation codes common to both the first and second entertainment devices, wherein the predetermined set of aggregation operation codes are stored within the first and second entertainment devices and conform to a consumer electronics control bus standard set of operation codes, and the content information request includes a parameter specifying a subset of the first set of content information; and
    wherein the predetermined set of aggregation operation codes include an operation code specifying that content information is to be sent as a background process, an operation code specifying that the content information is to be sent substantially immediately, and an operation code specifying that the second entertainment device to display the content information, wherein the subset is selectable by the user and includes a name-based subset and a time-based subset.

2. The method of claim 1, wherein the electronics control bus is a Consumer Electronics Control (CEC) bus configured to operate in accordance with the High-Definition Multimedia Interface (HDMI) standard.

3. The method of claim 1, wherein the first entertainment device is configured to display the aggregated content information as an electronic programming guide (EPG).

4. An entertainment device comprising:
    a memory configured to store aggregated content information including first content information; and
    a processor, the processor configured to send a content information request to a second entertainment device via an electronics control bus, receive second content information from the second entertainment device, aggregate the first content information with second content information to produce the aggregated content information, and respond to a request to display the aggregated content information via an on-screen display, wherein the first content information and the second content information comprise electronic programming guide information;
    wherein the electronics control bus is configured to allow a user to control the entertainment device and the second entertainment device utilizing a single remote control device, and further allows the entertainment device to command and control the second entertainment device without intervention from the user;
    wherein the content information request includes a first operation code incorporated into a first data block transmitted via the electronics control bus, and the second content information is received in conjunction with a second operation code incorporated into a second data block transmitted via the electronics control bus, wherein the first and second data blocks have substantially equal bit-lengths, and the second data block terminates with an end-of-message bit set only in the final block of the second content information; and
    wherein the first operation code and second operation code are each selected from a predetermined set of aggregation operation codes common to both the first and second entertainment devices, wherein the predetermined set of aggregation operation codes are stored within the first and second entertainment devices and conform to a consumer electronics control bus standard set of operation codes, and the content information request includes a parameter specifying a subset of the first set of content information;
    wherein the predetermined set of aggregation operation codes include an operation code specifying that content information is to be sent as a background process, an operation code specifying that the content information is to be sent substantially immediately, and an operation code specifying that the second entertainment device to display the content information, and wherein the subset is selectable by the user and includes a name-based subset and a time-based sub set.

5. The entertainment device of claim 4, wherein the electronics control bus is a Consumer Electronics Control (CEC) bus configured to operate in accordance with a High-Definition Multimedia Interface (HDMI) standard.

6. The entertainment device of claim 4, wherein the second entertainment device is configured to display the aggregated content information as an electronic programming guide (EPG).

7. A method of aggregating content information, comprising:
    storing first content information including electronic program guide information;
    sending a content information request via a Consumer Electronics Control (CEC) bus configured to operate in accordance with a High-Definition Multimedia Interface (HDMI) standard, wherein the CEC is configured to allow a user to control a first entertainment device storing the first content information and a second entertainment device storing second content information utilizing a single remote control device, and further allows the first entertainment device to command and control the second entertainment device without intervention from the user;

receiving the second content information including electronic program guide information via the CEC bus in response to the content information request;

aggregating the first content information with second content information to produce aggregated content information;

receiving a request to display the aggregated content information; and providing the aggregated content information for display via an on-screen display;

wherein the content information request includes a first operation code incorporated into a first data block transmitted via the CEC bus, and the second content information is received in conjunction with a second operation code incorporated into a second data block transmitted via the CEC bus, wherein the first and second data blocks have substantially equal bit-lengths, and the second data block terminates with an end-of-message bit set only in the final block of the second content information; and wherein the first operation code and second operation code are each selected from a predetermined set of aggregation operation codes common to both the first and second entertainment devices, wherein the predetermined set of aggregation operation codes are stored within the first and second entertainment devices and conform to the CEC standard set of operation codes, and the content information request includes a parameter specifying a subset of the first set of content information;

wherein the predetermined set of aggregation operation codes include an operation code specifying that content information is to be sent as a background process, an operation code specifying that the content information is to be sent substantially immediately, and an operation code specifying that the second entertainment device to display the content information, wherein the subset is selectable by the user and includes a name-based subset and a time-based subset.

8. The method of claim 7, the aggregated content information is provided as an electronic programming guide (EPG).

9. The method of claim 7, wherein the content information request includes a parameter specifying a manufacturer associated with a device from which the content information is requested.

* * * * *